(12) United States Patent
Poesen

(10) Patent No.: US 8,383,740 B1
(45) Date of Patent: Feb. 26, 2013

(54) HORIZONTAL AGITATOR

(75) Inventor: Dirk Poesen, Zolder (BE)

(73) Assignee: Ineos USA LLC, Lisle, IL (US)

( * ) Notice: Subject to any disclaimer, the term of this patent is extended or adjusted under 35 U.S.C. 154(b) by 66 days.

(21) Appl. No.: 13/136,865

(22) Filed: Aug. 12, 2011

(51) Int. Cl.
*C08F 2/00* (2006.01)
*C08F 210/00* (2006.01)
*B01J 10/00* (2006.01)

(52) U.S. Cl. .......................... 526/65; 526/348; 422/129

(58) Field of Classification Search .................... 526/65, 526/348; 422/129
See application file for complete search history.

(56) References Cited

U.S. PATENT DOCUMENTS 4,731,227 A * 3/1988 Pulvari .......................... 422/127

* cited by examiner

*Primary Examiner* — William Cheung
(74) *Attorney, Agent, or Firm* — James J. Drake

(57) ABSTRACT

The invention is an improved apparatus for continuously stirring polymer particles in reactive gas-filled polymerization reactors incorporating contiguous paddle stations on a coaxial drive shaft wherein the drive shaft is driven by a hydraulic motor.

6 Claims, No Drawings

HORIZONTAL AGITATOR

BACKGROUND OF THE INVENTION

1. Technical Field

The present invention an improved apparatus for stirring polymer particles in reactive, polymerization reactors incorporating a hydraulic motor on a coaxial drive shaft within the reactor.

2. Description of the Prior Art

U.S. Pat. No. 3,639,377 (Trieschmann et al.) describes polymerization of propylene which is carried out in the gas phase. In order that heat of polymerization should be effectively removed, excess monomeric propylene is introduced in liquid or partly liquefied form into the bottom of a vertically disposed cylindrical reaction zone. During polymerization, the fraction of unpolymerized propylene evaporates while absorbing the heat of polymerization. Evaporated propylene is removed from the reaction zone and condensed again outside the reaction zone.

While stating that removal of heat according this system of internal cooling also causes intense mixing of the solid polymer powder with the gas phase, Trieschmann et al. state that it is particularly advantageous to use a reactor having a spiral stirrer and conventional electrical motor with gearbox. Referring to FIGS. 1 and 3 of U.S. Pat. No. 3,639,377, the stirrer appears to be illustrated as having a "U" shape and rotates on a vertical shaft through the bottom of vertical reactor 6. Catalyst is pumped into the reactor through the top and polymer is discharged from the reactor by means of an external cyclone.

U.S. Pat. No. 3,944,534 (Sennari et al.) describes gas-phase polymerization of an .alpha.-olefin which is carried out in a reaction bed formed by circulation of particulate olefin polymer, caused principally by mechanical agitation to undergo circulation in the up-and-down directions within a substantially vertical-cylinder type reactor. The single-stage back-mixing reactor type described in Sennari et al. is not suitable for use in a continuous polymerization process with high activity catalysts, because age of catalyst carried out of the reactor is substantially the same as the age of catalyst in a back-mixing reactor.

Vapor-phase polymerization of a polymerizable monomer or mixture thereof to produce normally solid polymer substances using a horizontal polymerization reactor containing a subfluidized particulate bed of polymerized monomer has been described in a number of patents including: U.S. Pat. No. 3,957,448 (Shepard et al.), U.S. Pat. No. 3,965,083 (Jezl et al.), U.S. Pat. No. 3,971,768 (Peters et al.), and U.S. Pat. No. 4,627,735 (Rose et al.), the disclosures of which are specifically incorporated herein in their entirety by reference. These references describe polymerization processes and apparatus in which polymer is formed from gaseous monomer in horizontal stirred bed vessels.

In a single reactor, polymerization of monomer or mixture thereof from the vapor state is carried out by an essentially isobaric process typically using a high yield catalyst and cocatalyst. Typically, in operation of such processes and apparatus, particles of polymer are formed around solid catalyst particles.

The horizontally or vertically disposed reactor vessel has recycle gas, such as propylene, introduced into the bottom thereof. Typically, quench liquid, such as liquid propylene, is injected into the reactor from the top of the reactor, but may also be introduced with the circulating, optionally fluidizing, gas or directly into the polymerization bed.

Gases and vapors within the reactor vessel are free to circulate and mix together throughout the vapor space. For continuous production of some polymers, particularly copolymers, where it may be necessary to have different gas compositions at subsequent stages of polymerization, a series of two or more reactors is required.

Paddle wheels or other types of stirring vanes inside the vessel sweep through the bed of polymer particles and stir the contents of the vessel. The various types of stirring vanes include staggered paddles, inclined paddles, spiral vanes, or vanes provided with a scraper for scraping the internal wall of the reactor vessel.

A solid transition metal-containing catalyst component is injected at least one point into the reactor, and an aluminum alkyl cocatalyst plus modifiers may be injected at adjacent points.

When using a horizontal sub-fluidized bed reactor the catalyst is preferably added into the top, near one end (front end disposed opposite to a take-off end), of the reactor vessel. Solid particles of polymerized monomer are created in the vessel and are withdrawn from the take-off end thereof. Particles of polymerized monomer build up in the stirred reactor and traverse the length of the reactor essentially because of polymerization in the bed and not by the agitator. Advantageously, this condition is ensured by the design of the agitator such as to provide for agitation, but not for significant backward or forward movement of the particles. Since this stirred bed is not in a fluidized condition, back-mixing of the particles of polymerized monomer in the horizontally disposed reactor vessel is limited.

In contrast, solid particles in a fluidized bed are very well mixed. Even at commercially useful ratios of length to diameter, horizontal stirred-bed reactor systems can readily achieve a degree of mixing of solids equivalent to two, three, or more theoretical back-mix reactors. Thus, horizontal stirred-bed reactor systems are particularly advantageous, as compared fluidized-bed reactors, for direct production of polymers in a particulate no form.

This invention is however equally applicable to stirred vertical sub-fluidized or fluidized bed reactors. The bed may be kept in a fluidized state by introducing gaseous components, e.g. monomer on such flow rate (at least 0.2 m/s) which make the particles act as a fluid. The gas phase reactor used can be operated in the temperature range of 50 to 115 degrees centigrade, preferably between 60 and 110 degrees centigrade and reaction pressure between 10 and 40 bar and below the dew point. The partial pressure of the monomer is preferably between 2 and 40 bar or more. The polymerization bed is kept well mixed through use of agitator blades, preferably upward vertically extending paddles, connected to agitator arms attached to the drive shaft of a stirrer. The agitator arms may be horizontally extending arms with a freely selectable cross section. Typically the cross section of the arms is designed for minimum agitation resistance. The length of the agitator arms are usually designed such that the agitator blades connected to the ends of the agitator arms extend as close as possible to the inner walls of the reactor vessel where the fluidization action is inherently weakest. At least a portion of the gas flow introduced to the reactor may be passed to the reactor via a one flow channel provided to the inside of the agitator shaft. These reactors may be greater than 2 m in diameter, preferably greater than 4 m in diameter, most preferably greater than 5 m in diameter. The larger the reactor, the more difficult it is to maintain homogeneous fluidization and stirring throughout the entire volume of the fluidized bed.

It is desirable to create polymer particles as quickly as possible, and for this purpose a number of different high activity catalyst systems have been developed.

Use of solid, transition metal-based, olefin polymerization catalyst components is well known in the art including such solid components supported on a metal oxide, halide or other salt such as widely-described magnesium-containing, titanium halide based catalyst components. Such catalyst components commonly are referred to as "supported."

As is well known in the art, particulate polymers and copolymers may be sticky, i.e., tend to agglomerate, due to their chemical or mechanical properties or pass through a sticky phase during the production cycle. Sticky polymers also are referred to as non-free flowing polymers because of their tendency to compact into aggregates of much larger size than the original particles and not flow out of the relatively small openings in the bottom of product discharge tanks or purge bins. Polymers of this type show acceptable fluidity in a gas phase fluidized bed reactor, however, once motion ceases, the additional mechanical force provided by the fluidizing gas passing through the distributor plate is insufficient to break up the aggregates which form and the bed will not refluidize.

Although polymers that are sticky can be produced in non-gas phase processes, there are certain difficulties associated with the production of such products in, for example, slurry or bulk monomer polymerization processes. In such processes, the diluent or solvent is present in the resins exiting the reaction system at a high concentration leading to severe resin purging problems particularly if the material in question is a low molecular weight resin or a very low crystallinity resin. Environmental considerations are such that the dissolved monomers and diluent must be removed from the polymer prior to its exposure to air. Safety also dictates the removal of residual hydrocarbons so that closed containers containing the polymers will not exceed safe levels for volatiles in the gas head space over the resin. The safety and environmental concerns are accompanied by a definite economic factor in determining a preference for a quench-cooled, vapor-phase polymerization reactor containing a subfluidized particulate bed of polymerized monomer. The low number of moving parts and the relative lack of complexity in a basic subfluidized bed process enhances the operability of the process and typically results in lower costs of production. Low costs of production are due, in part, to low volumes of recycled process streams and a high unit throughput.

Horizontal stirred-bed reactor systems disclosed in Shepard et al., Jezl et al., Peters et al., and in U.S. Pat. No. 4,101,289 ('289), U.S. Pat. No. 4,129,701 ('701), U.S. Pat. No. 4,535,134 (de Lorenzo et al.), U.S. Pat. No. 4,627,735 (Rose et al.), U.S. Pat. No. 4,640,963 (Kreider et al.), U.S. Pat. No. 4,883,847 (Leung et al.), U.S. Pat. No. 4,921,919, (Lin et al.) and U.S. Pat. No. 5,504,166 (Buchelli et al.), the disclosures of which are specifically incorporated herein in their entirety by reference, largely or completely solve problems related to vapor phase, solution or slurry polymerization and reaps important economic benefits through savings in energy consumption, raw materials, and capital costs.

Although previously-known vapor-phase polymerization systems are entirely satisfactory for manufacture of many commercial polymers, a need still exists for improved mechanical stirring in a quench-cooled subfluidized particulate bed of polymerized monomer during continuous vapor phase polymerization. Desirably, the improved process produces fewer lumps and strings of resin. Such lumps and strings tend to hang-up or become trapped in transfer equipment and can even plug lines and valves. More desirably, the improved transfer apparatus increases the range in physical properties of polymers which can be manufactured at high rates of production without interruptions in operation. Especially welcome are improved methods and apparatus which more closely achieve continuous steady-state conditions throughout the vapor-phase process and thereby produce polymer products having more uniform physical properties.

One problem with known polymerization processes and apparatus using a vapor-phase polymerization system, is that lumps and strings of resin can form in a quench-cooled subfluidized particulate bed of polymerized monomer without reliable, continuous and accurate methods for mechanical stirring. Polymers formed from alkenes of 2 to 8 carbon atoms such as propylene or a mixture of propylene and other lower alkenes often have a tendency to agglomerate under operating conditions during polymerization. Such sticky polymers are difficult to maintain in granular or particulate forms during polymerization, particularly where high rates of production are desired. Further, it is advantageous to maintain a uniform temperature profile along the reactor. Agitator apparatuses according to this invention advantageously are useful for stirring of polymer particles, particularly in subfluidized particulate beds of alpha-olefin polymers in high pressure, reactive gas-filled, continuous, vapor-phase polymerization reactors.

SUMMARY OF THE INVENTION

The invention is an improved apparatus for continuously stirring polymer particles in reactive gas-filled polymerization reactors incorporating contiguous paddle stations on a coaxial drive shaft wherein the drive shaft is driven by a hydraulic motor.

One aspect of this invention is apparatus for mechanically stirring polymer particles in a horizontally disposed cylindrical polymerization reactor containing subfluidized particulate polymer bed wherein at least a portion of the heat of polymerization is removed by evaporative cooling using a readily volatilizable quench liquid. The apparatus includes a drive shaft coaxially mounted for rotation about its longitudinal axis and predominantly within a cylindrical polymerization reactor.

A preferred embodiment of the invention is a process for continuous vapor phase polymerization of a polymerizable monomer or mixture thereof to produce normally solid polymer in one or any combination of two or more horizontally disposed cylindrical polymerization reactors wherein at least a portion of the heat of polymerization is removed by evaporative cooling using a readily volatilizable quench liquid, each containing reactive gases, a quench-cooled subfluidized mechanically-stirred bed of particulate polymer. Typically, a stirring means includes a drive shaft being coaxially mounted for rotation about its longitudinal axis and driven by a hydraulic motor and having a plurality of paddles each of which has a center line located along a radius perpendicular to the longitudinal axis of the drive shaft with a distal end positioned in close proximity to the inner surface of the reactor wall so as to sweep through a cylindrical zone within the reactor.

The process further comprises providing the stirring means with two or more classes of substantially contiguous paddle stations disposed along the drive shaft within at least one reactor; multiple sub-stations, in at least one paddle station class, each substation having a width along the shaft of no more than 50 percent of the total width of a paddle station; and one or more sub-station paddles attached to the shaft at each sub-station, so as to sweep through a sub-section of the cylindrical zone within the reactor to mechanically stir the polymer particles.

DESCRIPTION OF THE PREFERRED EMBODIMENT(S)

Apparatus for mechanically stirring polymer particles in reactive gas-filled vessels according to the invention is used advantageously in a continuous vapor-phase polymerization of at least ethylene or one alpha-olefin monomer in a reaction mixture comprising a first olefin monomer and, if copolymerization is occurring, a second olefin monomer, comprising: conducting the polymerization under polymerization conditions of temperature and pressure in the presence of hydrogen and a catalyst system comprising a solid catalyst comprising a first transition metal containing component and a cocatalyst comprising a second metal-containing component, in at least one reactor. For terpolymerization reactions, a third olefin monomer may also be added.

In each such reactor at least a portion of the heat of polymerization is removed by evaporative cooling of a volatilizable quench liquid comprising liquefied first monomer and, if copolymerization is occurring, liquefied second monomer. As disclosed above, for terpolymerization reactions, a third olefin monomer including, preferably, propylene, ethylene and butane may be added.

Preferably, each reactor is a substantially horizontal reactor of substantially circular cross-section containing a hydraulic motor-driven, centrally-located drive shaft extending longitudinally through such reactor to which are attached a plurality of adjacently located paddles. Typically, stirring causes no significant forward or backward overall movement of the particulate polymer product contained in such reactor and paddles extend transversely within and to a short distance from the internal surfaces of such reactor. However, the multiple substation paddle arrangement of this invention, does impart some forward and backward motion to the polymer particles which is believed to be advantageous. The reactor system also includes driving means in each such reactor for the drive shaft; one or more reactor off-gas outlets spaced along the topward part of each such reactor; a plurality of vapor recycle inlets spaced along the bottomward part of each such reactor for recycle of unreacted first monomer and, if copolymerization is occurring, unreacted second monomer (or, in the case of terpolymerization, unreacted third monomer); one or more catalyst and cocatalyst addition inlets spaced along each such reactor; a plurality of quench liquid inlets spaced along the topward part of each such reactor whereby quench liquid can be introduced into such reactor; and a discharge or take-off means in each such reactor for the particulate polymer product at one or both ends of such reactor, preferably at one end of such reactor.

The apparatus of the invention includes a continuously driven hydraulic motor mounted to the drive shaft. A preferred hydraulic motor according to the apparatus of the invention is a Hägglunds Drives hydraulic industrial motor MARATHON of the radial-piston type with a rotating cylinder block/hollow shaft and a stationary case. The cylinder block is mounted in fixed roller bearings in the case.

The motor includes an even number of pistons radially located in bores inside the cylinder block, and the valve plate directs the incoming and outgoing oil to and from the working pistons. Each piston is working against a cam roller.

When the hydraulic pressure is acting on the pistons, the cam rollers are pushed against the slope on the cam ring that is rigidly connected to the case, thereby producing a torque. The reaction force is transferred by the guide roller bearings on the cam rollers shaft ends to the two guide plates which are connected to the cylinder block/hollow shaft. Rotation therefore occurs, and the torque available is proportional to the pressure in the system. The motor is connected to the shaft of the driven machine through the hollow shaft of the cylinder block. The torque is transmitted by using a mechanical shaft coupling, or alternatively by splines. The preferred motor type for a polypropylene reactor according to the invention is a Hägglunds type DTMA 3200.

Reactive gases include, typically, at least one member of the group consisting of ethylene (ethene), propylene (propene), a butene, and mixtures thereof. In a preferred aspect of the invention the reactive gases in the upstream reactor comprise at least two polymerizable monomers.

Processes for continuous polymerization according to the present invention generally are carried out using one or two serially disposed vapor phase polymerization reactors in which subfluidized particulate beds of polymerized monomer are contained in a cylindrical portion of each polymerization reactor with a horizontally disposed axis of rotation. These reactors have, typically, the same nominal dimensions, such as, length and diameter. The axis of rotation of the upstream reactor can, advantageously, be disposed at an elevation the same as or higher than the axis of rotation of the downstream reactor.

The continuous, vapor-phase polymerization system described herein can be applied to the polymerization of polymerizable monomers which are polymerizable below the softening point of their polymer forms including ethylene, propylene, 4-methyl-pentene-1, butene-1, vinyl chloride, butadiene, and mixtures of such monomers. Particularly suitable are the polymerization of ethylene and propylene.

Processes according to the present invention are, advantageously, used for continuous polymerization of at least two monomers. Preferably, the polymerizable monomers are ethylene and propylene, more preferably, the composition of the gas phase in the upstream reactor is predominantly propylene.

The subfluidized particulate beds of polymerized monomer are mechanically stirred and have a free surface within each reactor. Transfer of polymer particles is, advantageously, carried out discharging mixture of polymer particles and reactive gases from the upstream reactor through an outlet port located in the reactor wall at an elevation below the free surface of the subfluidized bed of polymerized monomer therein.

Suitable rates of quench liquid addition preferably are large enough to obtain the maximum cooling effect of the quench liquid, but low enough to keep the particulate bed of polymerized monomer dry. Generally, the quench liquid carries away 50 percent or more of the heat of polymerization.

According to the invention there is provided a reactor system and process which can economically and efficiently convert a polymerizable monomer or a mixture thereof to polymer substances in a vapor phase, essentially isobaric polymerization process, which reactor is a subfluidized stirred-bed, quench-cooled, horizontal reactor with essentially total reactor off-gas recycle capable of multiple temperature operation. The apparatus is, generally, characterized by a stirred agitation of the quench-cooled polymer bed contained in therein by transversely oriented paddles connected to a longitudinally oriented drive shaft typically located centrally in the reactor.

According to the invention, the continuous, vapor-phase polymerization system is characterized by having at least one horizontally disposed polymerization reactor section containing a mechanically-stirred subfluidized particulate polymer bed wherein at least a portion of the heat of polymerization is removed by evaporative cooling using a readily volatilizable quench liquid. Mechanical agitation of the polymer bed is, generally, by transversely oriented paddles connected to a longitudinally oriented drive shaft typically located centrally in the reactor. The reactor can be segmented into two or more polymerization sections which, optionally, can be separated one from another by suitable barriers such as weirs.

Preferably, the apparatus of the present invention is employed with at least one substantially horizontal reactor of substantially circular cross-section containing a centrally-located drive shaft extending longitudinally through each such reactor, to which are attached a plurality of adjacently located paddles, which paddles extend transversely within and to a short distance from the internal surfaces of such reactor; driving means in each such reactor for the drive shaft; one or more reactor off-gas outlets spaced along the topward part of each such reactor; a plurality of vapor recycle inlets spaced along the bottomward part of the reactor; one or more catalyst and cocatalyst addition inlets spaced along each such reactor; a plurality of quench liquid inlets spaced along the topward part of each such reactor whereby quench liquid can be introduced into each such reactor; and take-off means in each such reactor for the particulate product at one or both ends, preferably at one end of such reactor.

Referring now to the drawings in greater detail, there is illustrated in FIG. 1 a vapor-phase polymerization system. A horizontally disposed polymerization reactor containing a mechanically-stirred, subfluidized particulate polymer bed wherein at least a portion of the heat of polymerization is removed by evaporative cooling using a readily volatilizable quench liquid, with essentially total reactor off-gas recycle, is, generally, indicated by the numeral 11.

Typically, it is desirable that stirring of the subfluidized bed causes no significant forward or backward overall movement of the particulate polymer product contained in a vapor-phase polymerization reactor. Overall movement of particulate polymerized monomer is best modeled as "plug-flow" or as a series of many "perfectly" mixed zones. Station paddles of at least one, preferably every, class of stations have a center line located along a radius perpendicular to the longitudinal axis of the drive shaft with a distal end positioned in close proximity to the inner surface of the reactor wall. Preferably, at least one class has paddles which are symmetrical about a plane containing its a center line and perpendicular to the longitudinal axis of the drive shaft. Station paddles of at least one, preferably every, class of stations have paddles which are essentially flat.

Preferably, the reactor in the apparatus of the invention has a diameter of greater than two meters and operates at a speed of from about five to about 25 rotations per minute (rpm), more preferably from about ten to about 20 rotations per minute (rpm). The length to diameter ratio is preferably greater than 4, more preferably greater than 5, most preferably between 4 and 6. A preferred agitator tip speed is from about 0.5 meters per second (m/s) to about five meters per second (m/s), more preferably between 2 and 3 m/s. Finally, a preferred power consumption for the apparatus of the invention is less than 35 kilowatt hours per ton of polymer produced, more preferably less than 25 kilowatt hours per ton of polymer produced, most preferably less than 20 kilowatt hours per ton of polymer produced.

A variable speed hydraulic drive enables the rpm and tip speed to be easily optimized for a given reactor diameter, bed volume and powder characteristics, thus delivering an optimum balance of power consumption and bed mixing whilst also avoiding fouling and/or strings.

According to the apparatus of the invention, as the tip speed goes up with increasing diameter at constant speed, an operator is able to vary the speed through the hydraulic drive. This advantageously enables the operator to lower the speed, if necessary, in order to avoid problems such as unexpected breakdowns of the apparatus, throwing more powder into the gas phase (or dome), excessive shear, incorrect backmixing and the like.

The torque/speed characteristics of the conventional electrical motor with gearbox require a special 'fluid coupling' and an oversized motor, to make it possible for the system to start, since the agitator requires the highest torque at lowest speeds (i.e., once it's turning, it easier to keep it turning), while a conventional electrical motor has almost no torque at low speed. This requires the addition of a fluid coupling to allow the motor to get some speed, with the fluid coupling slowing the starting time to transfer torque. Further, a conventional motor needs to be over-dimensioned, in order to make the initial torque transfer to get the agitator to speed. Advantageously, the hydraulic drive of the invention has a torque/speed profile that inherently provides high torque at low speeds and lower torque at higher speeds. As the diameter and polymer volume of the polymerization reactors increases so does the size motors required for the agitators. The selection of an agitator drive motor, preferably variable speed, provides high torque at low speeds and lower torque at higher speeds without the use of reduction gears enables an advantaged initial design combined with optimized on-going operations. Hydraulic drives deliver these features and become increasingly advantageous over conventional electric motors, variable speed or otherwise, for motors having an installed power of greater than 200 kW, particularly greater than 500 kW, most particularly greater than 1000 kW.

The advantage becomes important for reactors having a diameter greater than two meters. As the drives correspondingly increase their size, the hydraulic drive (with its intrinsic variable speed capabilities described above) of the invention becomes more advantageous when compared to the conventional electrical motor with gearbox, even when considering a cheaper fixed speed electrical motor/gearbox. In order to achieve a variable speed on a conventional motor with gearbox for large diameter reactors, the expense of using a gearbox increases substantially and the technical requirements for drive speed often require different gearbox types, which are far more expensive and require the use of two motors (one large fixed speed and one smaller variable speed).

The hydraulically driven motor thereby provides for a low speed and high torque rotation of the shaft without the use of a reduction gear. Ideally the speed of the hydraulic motor be controlled independently from torque, in one embodiment the speed is kept constant whilst torque changes.

Advantageously, the hydraulic motor as used in the apparatus of the invention is significantly, potentially an order of magnitude, lighter in weight than an electronic motor/gearbox (as the motor is very compact, while the hydraulic pumps driven by the hydraulic motor can be, without any issues, installed on ground floor, on any convenient location in the vicinity of the reactor).

According to the preferred embodiment of the apparatus of the invention, the hydraulic motor is directly mounted on the shaft and in-line with the torque centerline, which facilitates the high reaction force transfer dramatically.

As a result, the total structural weight and force bearing assembly associated with the hydraulic drive assembly is a fraction of the weight of a conventional motor/gearbox and the hydraulic motor delivers a high torque and low speed characteristic to the drive.

The lower weight and mounting advantages of hydraulically driven motors particularly facilitates the installation of horizontal stirred reactors with one higher than another, preferably substantially vertically above the other. Advantageously, paddles are distributed to define by rotation a cylindrical envelope having an outer diameter which typically is at least about 0.985 times the inner diameter of the cylindrical reactor in which the paddles are rotated, preferably at least about 0.995 times the inner diameter, and more preferably even up to about 0.999 times the inner diameter. The length of the paddles which define the rotation envelope is sufficient to assure that polymer is swept from the inner surface of the reactor during rotation. The agitator is designed to ensure that the mass flow is substantially ensured in the boundary zones, for example, in the outermost and innermost operating regions of the agitator.

As employed herein, unless otherwise indicated, the term "polymerization" is intended to include both homopolymerization and copolymerization, and the term "polymer" is intended to include both homopolymer and copolymer.

The method of this invention is useful in the stereospecific polymerization of alpha-olefins containing 2 or more carbon atoms such as ethylene, propylene, butene-1, pentene-1,4-penteneentene-1, and hexene-1, as well as mixtures thereof and mixtures thereof with ethylene. The method of this invention is particularly effective in the stereospecific polymerization of propylene or mixtures thereof with ethylene and/or a higher alpha-olefin. According to the invention, highly crystalline polyalpha-olefin homopolymers or copolymers are prepared by contacting at least one alpha-olefin with the catalyst described hereinbelow under polymerization conditions. Such conditions include polymerization temperature and time, pressure(s) of the monomer(s), avoidance of contamination of catalyst, the use of chain transfer agents to control polymer molecular weights, and other conditions well known to persons skilled in the art.

The amount of the catalyst or catalyst component to be employed in the method of this invention varies depending on choice of reactor size, monomer to be polymerized, the specific catalyst used, and other factors known to persons of skill in the art. Typically, a catalyst or catalyst component is used in amounts ranging from about 0.2 to about 0.01 milligrams of catalyst to gram of polymer produced.

Use of solid, transition metal-based, high activity, olefin polymerization catalyst components is preferable in the reactor system described in this invention and is well known in the art including such solid components supported on a metal oxide, halide or other salt such as widely-described magnesium-containing, titanium halide-based catalyst components. Numerous supported, magnesium-containing, titanium-containing, electron donor containing olefin polymerization or copolymerization catalysts have been disclosed. For example, Arzoumanidis et al., U.S. Pat. No. 4,866,022, incorporated by reference herein, discloses a method for forming an advantageous alpha-olefin polymerization or copolymerization catalyst or catalyst component useful in this invention. In addition to the solid, magnesium containing, titanium containing catalyst component, the polymerization catalyst system used to produce propylene polymers uses an aluminum alkyl component, such as triethylaluminum, and typically an external modifier component such as a silane compound as described in U.S. Pat. No. 4,829,038, incorporated by reference herein.

Preferred catalysts and cocatalysts are high yield catalysts. "High yield" means that the residues of catalysts and cocatalysts do not have to be removed from the polymer products in a separate "deashing" process. Yields of such catalyst typically exceed 5000 grams of polymer per gram of catalyst and preferably exceed 15,000 grams of polymer per gram of catalyst.

Irrespective of the polymerization or copolymerization process employed, polymerization or copolymerization should be carried out at temperatures sufficiently high to ensure reasonable polymerization or copolymerization rates and avoid unduly long reactor residence times, but not so high as to result in the production of unreasonably high levels of strings and lumps due to excessively rapid polymerization or copolymerization rates.

Generally, temperatures range from about 0.degree. to about 120.degree. C. with a range of from about 20.degree. C. to about 95.degree. C. being preferred from the standpoint of attaining good catalyst performance and high production rates. More preferably, polymerization according to this invention is carried out at temperatures ranging from about 50.degree. C. to about 80.degree. C.

Alpha-olefin polymerization or copolymerization according to this invention is carried out at monomer pressures of about atmospheric or above. Generally, monomer pressures range from about 20 psi to about 600 psi (140 kPa to 4100 kPa), although in vapor phase polymerizations or copolymerizations, monomer pressures should not be below the vapor pressure at the polymerization or copolymerization temperature of the alpha-olefin to be polymerized or copolymerized.

The polymerization or copolymerization time will generally range from about ½ to several hours.

Examples of gas-phase polymerization or copolymerization processes in which such catalyst or catalyst component is useful are described in U.S. Pat. Nos. 3,957,448; 3,965,083; 3,971,786; 3,970,611; 4,129,701; 4,101,289; 3,652,527; 4,003,712; 4,326,048; 4,337,069; 4,535,134; 4,569,809, 4,610,574; 4,640,963; 4,708,787; 5,209,607; and 5,504,166, all incorporated by reference herein. Typical gas-phase olefin polymerization or copolymerization reactor systems comprise at least one reactor vessel to which olefin monomer and catalyst components can be added and which contain an agitated bed of forming polymer particles. Typically, catalyst components are added together or separately through one or more valve-controlled ports in the single or first reactor vessel. Olefin monomer, typically, is provided to the reactor through a recycle gas system in which unreacted monomer removed as off-gas and fresh feed monomer are mixed and injected into the reactor vessel. For production of impact copolymers, homopolymer formed from the first monomer in the first reactor is reacted with the second monomer in the second reactor. A quench liquid, which can be liquid monomer, can be added to polymerizing or copolymerizing olefin to the reactor in order to control temperature.

Irrespective of polymerization or copolymerization technique, polymerization or copolymerization is carried out under conditions that exclude oxygen, water, and other materials that act as catalyst poisons. Also, polymerization or copolymerization can be carried out in the presence of additives to control polymer or copolymer molecular weights. Hydrogen is typically employed for this purpose in a manner well known to persons of skill in the art. Although not usually required, upon completion of polymerization or copolymerization, or when it is desired to terminate polymerization or copolymerization or at least temporarily deactivate the catalyst or catalyst component of this invention, the catalyst can be contacted with water, alcohols, acetone, or other suitable catalyst deactivators a manner known to persons of skill in the art.

The products produced in accordance with the process of this invention are normally solid, predominantly isotactic polyalpha-olefins. Homopolymer or copolymer yields are sufficiently high relative to the amount of catalyst employed so that useful products can be obtained without separation of catalyst residues. Further, levels of stereorandom by-products are sufficiently low so that useful products can be obtained without separation thereof. The polymer or copolymer products produced in the presence of the catalyst can be fabricated into useful articles by extrusion, injection molding, and other common techniques.

The method is particularly suitable for polymerising olefins in the gas phase at an absolute pressure of between 0.5 and 6 MPa and at a temperature of between 30° C. and 130° C. For example, for LLDPE production the temperature is suitably in the range 75-100° C. and for HDPE the temperature is typically 80-115° C. depending on the activity of the catalyst used and the polymer properties desired.

The total pressure in the gas phase polymerisation reactor is most preferably between 1.5 and 3 MPa.

The method of the present invention may be applied to polymerisation processes using any suitable polymerisation catalyst, including Ziegler-Natta type catalysts chromium oxide type catalysts, and metallocene type catalysts.

The copolymerisation may therefore be carried out, for example, in the presence of a catalyst of Ziegler-Natta type comprising at least one transition metal in combination with a cocatalyst comprising an organometallic compound, for example an organoaluminium compound. The catalyst essentially comprises an atom of a transition metal selected from the metals of groups IV to VI of the periodic classification of the elements, such as titanium, vanadium, chromium, zirconium or hafnium, optionally a magnesium atom and a halogen atom. The catalyst may be supported on a porous refractory oxide such as silica or alumina or may be combined with a solid magnesium compound, such as the chloride, the oxide, the hydroxy chloride or an alcoholate of magnesium. By way of example, mention may be made of the catalysts described in the patents U.S. Pat. No. 4,260,709, EP 0 598 094, EP 0 099 774 and EP 0 175 532. The present invention is also particularly appropriate for silica-supported Ziegler catalysts, for example those described in Patents WO 93/09147, WO 95/13873, WO 95/34380, WO 99/05187 and U.S. Pat. No. 6,140,264. The catalyst can be used as it is or optionally in the form of a coated catalyst or prepolymer containing, for example, from 10-5 to 3, preferably from 10-3 to 10-1, millimoles of transition metal per gram of polymer; it can be used together with a cocatalyst or activator, e.g. an organometallic compound of a metal from groups I to III of the Periodic Classification of the Elements, such as, for example, an organoaluminium compound. It is also possible to use a catalyst complexed by a metal selected from those of group VIII of the periodic classification of the elements, such as, for example, nickel, iron or cobalt. By way of examples, mention may be made of those described in Patent Application WO 98/27124 or WO 98/2638. It is also possible to use catalysts based on platinum or palladium as the transition metal; complexes of this type are described, for example, in the Patent WO 96/23010.

The copolymerisation may thus also be carried out in the presence of a chromium oxide catalyst. Examples of chromium oxide catalysts are typically those comprising a refractory oxide support which is activated by a heat treatment advantageously carried out at a temperature of at least 250° C. and at most equal to the temperature at which the granular support begins to sinter and under a non-reducing atmosphere and preferably an oxidising atmosphere. This catalyst can be obtained by a great number of known process, in particular by those according to which, in a first stage, a chromium compound, such as a chromium oxide, generally of formula $CrO_3$, or a chromium compound which can be converted by calcination into chromium oxide, such as, for example, a chromium nitrate or sulphate, an ammonium chromate, a chromium carbonate, acetate or acetylacetonate, or a tert-butyl chromate, is combined with a granular support based on refractory oxide, such as, for example, silica, alumina, zirconium oxide, titanium oxide or a mixture of these oxides or aluminum or boron phosphates or mixtures in any proportion of these phosphates with the above mentioned oxides. In a second stage, the chromium compound thus combined with the granular support is subjected to a so-called activation operation by heat treatment in a non-reducing atmosphere and preferably an oxidising atmosphere at a temperature of at least 250° C. and at most that at which the granular support begins to sinter. The temperature of the heat treatment is generally between 250° C. and 1200° C. and preferably between 350 and 1000° C. Such catalyst preferably contains from 0.05 to 5%, more preferably from 0.1 to 2%, by weight of chromium; it can contain, in addition to the chromium, from 0.1 to 10% of titanium in the form of titanium oxide and/or fluorine and/or aluminum, in particular in the form of aluminum oxide; it can be used as it is or optionally in the form of a coated catalyst or prepolymer containing, for example, from 10-5 to 3, preferably from 10-3 to 10-1, millimoles of chromium per gram of polymer. The chromium oxide catalysts may be used together with a cocatalyst or activator, e.g. an organometallic compound of a metal from groups I to III of the Periodic Classification of the Elements, such as, for example, an organoaluminium compound. Examples of catalysts can be found, for example, in EP 0 275 675, EP 0 453 116, or WO 99/12978.

The method of the present invention is also preferably applied to a polymerisation process in which the catalyst is a metallocene-type catalyst. In particular, the present invention has been found to provide significant improvements when used for such systems.

With regards to particular metallocene-type catalysts, mention may be made, by way of example, of those corresponding to the formula

$[L]_m M[A]_n$ where L is a bulky ligand; A is a leaving group, M is a transition metal and m and n are such that the total valency of the ligand corresponds to the valency of the transition metal. The ligands L and A may be bridged. L is generally a ligand of the cyclopentadienyl type.

Examples of metallocene catalysts of this type are described in U.S. Pat. Nos. 4,530,914, 5,124,418, 4,808,561, 4,897,455, 5,278,264, 5,278,119, 5,304,614, and EP 0 129 368, EP 0 591 756, EP 0 520 732, EP 0 420 436, WO 91/04257, WO 92/00333, WO 93/08221, WO 93/08199.

It is also possible to use with advantage the metallocene-based catalyst systems as described in U.S. Pat. Nos. 4,871,705, 4,937,299, 5,324,800, 5,017,714, 5,120,867, 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031 and EP 0 561 476, EP 0 279 586, EP 0 594 218, WO 94/10180 and WO 2006/085051.

Mention may also be made of the Patents WO 92/00333, WO 94/07928, WO 91/04257, WO 94/03506, U.S. Pat. Nos. 5,057,475, 5,096,867, 5,055,438, 5,198,401, 5,227,440, 5,264,405, EP-A-0 420 436, U.S. Pat. Nos. 5,604,802, 5,149,819, 5,243,001, 5,239,022, 5,276,208, 5,296,434, 5,321,106, 5,329,031, 5,304,614, WO 93/08221, WO 93/08199 and EP 0 578 838. The preferred transition metal compounds of the catalyst are those of group 4, in particular zirconium, titanium and hafnium.

The metallocene catalyst may also be represented by the general formula (Cp)m MRnR'p, where Cp is a ring of the cyclopentadienyl type, M is a transition metal of group 4, 5 or 6; R and R' may be selected from halogens and hydrocarbyl or hydrocarboxyl groups; m=1-3, n=0-3, p=0-3 and the sum m+n+p equals the oxidation state of M; preferably, m=2, n=1 and p=1.

The metallocene catalyst may be also represented by the general formula (C5 R'm)p R"s(C5 R'm)Me Q3-p-x, or R"s(C5 R'm)2 MeQ' where Me is a transition metal of group 4, 5 or 6, at least one C5 R'm is a substituted cyclopentadienyl, each R', which may be identical or different, is hydrogen, an alkyl, alkenyl, aryl, alkylaryl or arylalkyl radical having 1 to 20 carbon atoms, or two carbon atoms linked together to form part of a substituted or unsubstituted ring having 4 to 20 carbon atoms, R" is a radical containing one or more or a combination of carbon, germanium, silicon, phosphorus or nitrogen atoms which bridges two rings (C5 R'm), or which bridges one ring (C5 R'm) to M, when p=0, x=1, else "x" is always 0, each Q, which may be identical or different, is an alkyl, alkenyl, aryl, alkylaryl or arylalkyl radical having 1 to 20 carbon atoms, a halogen or an alkoxide, Q' is an alkylidene radical having 1 to 20 carbon atoms, s is 0 or 1, and when s is 0, m is 5 and p is 0, 1 or 2 and when s is 1, m is 4 and p is 1.

The metallocene catalysts are generally used with an activator or cocatalyst. Examples which may be mentioned include alumoxane and/or ionic or neutral ionising activators, or compounds such as pentafluorophenyl tri(n-butyl)ammonium tetraborate or the boric metalloid precursor of trisperfluorophenyl, which ionises the neutral metallocene compound. Compounds of this type are described in EP 0 570 982, EP 0 520 732, EP 0 495 375, EP 0 426 637, EP 0 500 944, EP 0 277 003, EP 0 277 004, U.S. Pat. Nos. 5,153,157, 5,198,401, 5,066,741, 5,206,197 and 5,241,025, and WO 94/07928.

Catalyst combinations may also be used, for example those described in U.S. Pat. Nos. 5,281,679, 4,701,432, 5,124,418, 5,077,255 and 5,183,867.

Other examples of metallocene catalysts are described in Patents EP 0 593 083, U.S. Pat. Nos. 5,317,036, 4,937,217, 4,912,075, 4,935,397, 4,937,301, 4,914,253, 5,008,228, 5,086,025, 5,147,949, 4,808,561, 4,897,455, 4,701,432, 5,238,892, 5,240,894, 5,332,706, WO 95/10542, WO 95/07939, WO 94/26793 and WO 95/12622.

Preferably, the metallocene comprises

A) an inert support,

B) a group 4-10 metal complex corresponding to the formula:

where M is a metal of one of groups 4 to 10 of the Periodic Table of the Elements, Cp is an anionic ligand group, Z is a divalent moiety linked to Cp and linked to M, comprising boron or an element of group 14 of the Periodic Table of the Elements, and further comprising nitrogen, phosphorus, sulphur or oxygen;

X is a neutral conjugated diene ligand group having up to 60 atoms, or a dianionic derivative, and C) an ionic cocatalyst capable of converting the metal complex into an active polymerisation catalyst.

Examples of cocatalysts are described in U.S. Pat. Nos. 5,132,380, 5,153,157, 5,064,802, 5,321,106, 5,721,185 and 5,350,723. Mention may also be made of the complexes described in WO 96/28480 and WO 98/27119.

The catalyst may be used in the form of a prepolymer prepared beforehand during a prepolymerisation step from catalysts described above. The prepolymerisation may be carried out by any process, for example a prepolymerisation in a liquid hydrocarbon or in gas phase in accordance with a batchwise, semicontinuous or continuous process.

The catalyst or the prepolymer may be introduced into the reactor continuously or discontinuously.

What is claimed is:

1. An olefin polymerization process comprising polymerization of at least one olefin monomer in more than one polymerization zone of a polymerization process wherein the polymerization zone comprises
    one or more reactor vessels to which olefin monomer and catalyst components can be added and which contain an agitated bed of forming polymer particles, wherein:
        (1) each reactor vessel has a drive shaft disposed coaxially within it, the drive shaft being mounted for rotation about its longitudinal axis and driven by a motor; and
        (2) wherein the motor is characterized by an absence of reduction gears;
        (3) wherein the agitated bed comprises an agitator motor that is a hydraulic motor.

2. The olefin polymerization process of claim 1 wherein the speed of the drive shaft is maintained constant during variations in torque.

3. The olefin polymerization process of claim 1 wherein the motor is a variable speed motor.

4. The olefin polymerization process of claim 2 wherein the motor is a variable speed motor.

5. The olefin polymerization process of claim 1 wherein the motor is a variable speed motor.

6. The olefin polymerization process of claim 2 wherein the motor is a variable speed motor.

* * * * *